United States Patent [19]

Hettinga et al.

[11] Patent Number: 5,437,823
[45] Date of Patent: Aug. 1, 1995

[54] METHOD FOR MOLDING A PLASTIC ARTICLE OF VARIED DENSITY

[76] Inventors: Siebolt Hettinga, 2123 NW. 111th St., Des Moines, Iowa 50325; Harold J. Buehl, 4714 EP True Pkwy., #205, West Des Moines, Iowa 50265

[21] Appl. No.: 82,266

[22] Filed: Jun. 23, 1993

[51] Int. Cl.$^6$ .................. B29C 44/06; B29C 44/10
[52] U.S. Cl. ............................ 264/45.5; 264/54; 264/328.11
[58] Field of Search ............... 264/45.5, 51, 54, 328.7, 264/328.11

[56] References Cited

U.S. PATENT DOCUMENTS

| | | | |
|---|---|---|---|
| 3,983,196 | 9/1976 | Gray | 264/45.5 |
| 4,096,218 | 6/1978 | Yasuike et al. | 264/328.7 |
| 4,729,863 | 3/1988 | Muller et al. | 264/328.7 |
| 5,130,075 | 7/1992 | Hara et al. | 264/328.7 |
| 5,252,269 | 10/1993 | Hara et al. | 264/45.5 |
| 5,281,376 | 1/1994 | Hara et al. | 264/46.4 |
| 5,336,463 | 8/1994 | Hara et al. | 264/328.7 |

FOREIGN PATENT DOCUMENTS

| | | |
|---|---|---|
| 0035916 | 9/1981 | European Pat. Off. . |
| 0480456 | 4/1992 | European Pat. Off. . |
| 1268819 | 5/1968 | Germany . |
| 58-039425 | 3/1983 | Japan .............. 264/328.7 |
| 61-068209 | 4/1986 | Japan .............. 264/328.7 |
| WO9218561 | 10/1992 | WIPO . |

*Primary Examiner*—Allan R. Kuhns
*Attorney, Agent, or Firm*—Brian J. Laurenzo; Kent A. Herink

[57] ABSTRACT

A method of molding a plastic part with a controlled density whereby a blowing agent is added to a plastic material and the material is injected into a mold cavity of a mold unit. The interior walls of the mold cavity are maintained at a temperature sufficient to prevent the outer skin of the forming plastic article from producing gas bubbles. The volume of the mold cavity is increased to allow bubbles to produce and uniformly distribute themselves throughout the mold cavity and then a re-compression phase is instituted whereby the desired density of the finished plastic article is achieved without voids or aberrations appearing in the surface of the plastic article.

8 Claims, 2 Drawing Sheets

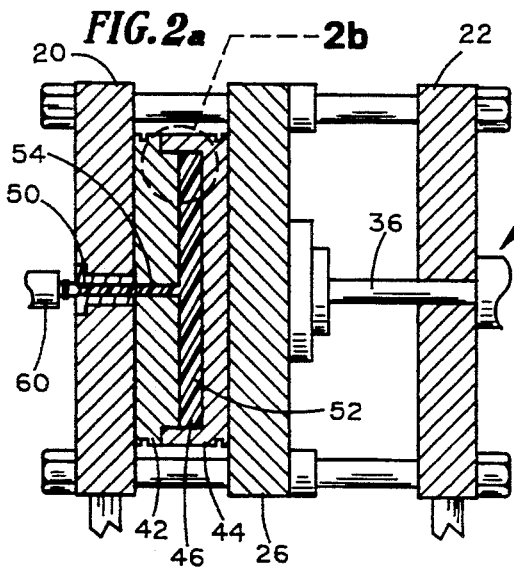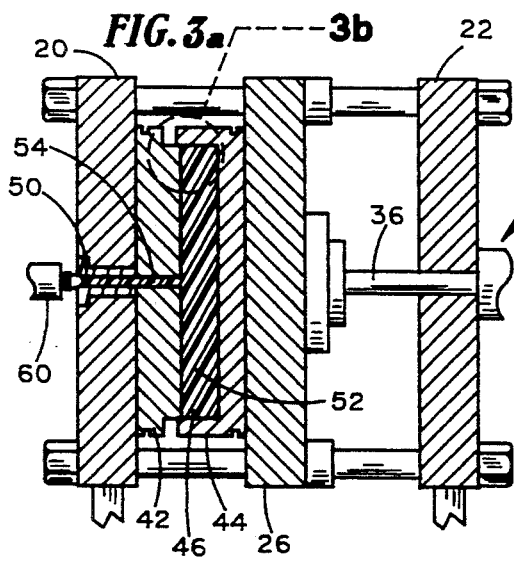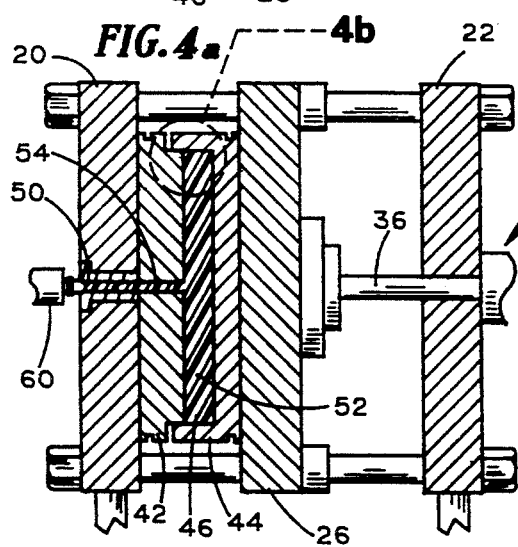

METHOD FOR MOLDING A PLASTIC ARTICLE OF VARIED DENSITY

BACKGROUND OF THE INVENTION

This invention relates to a molding apparatus and method for molding a plastic article of varied density and, more particularly, to a molding apparatus and method which allows a plastic article to be molded with a smooth dense outer shell and a foam interior.

Injection molding machines generally include a two section mold unit wherein one of the mold sections is stationary and includes an end gate opening for the injection of mold material into the cavity. The other mold section is generally movable between an open position away from the stationary mold section and a closed position wherein the two mold sections are in sealed contact engagement to form the mold cavity.

Once the mold cavity has been formed a screw or similar injection device is used to inject a plastic material into the mold cavity where the material is cured under pressure. It is well known in the prior art to combine a blowing agent with the plastic material to decrease the density of the finished plastic part.

Injection molding provides an efficient means for producing plastic articles both quickly and economically. It is often desired to create a plastic article of a decreased density which reduces costs by reducing the amount of material required to make the part and significantly decreases the weight of the part which is a highly desirable characteristic for many applications. One way of creating a plastic part of reduced density is through the use of a blowing agent. Most blowing agents are heat activated and when mixed with a plastic material under control conditions they produce bubbles. If the blowing agent is evenly distributed throughout the plastic material the bubbles are generally distributed evenly throughout the plastic and become trapped within the plastic article as the article cures. These trapped bubbles form a cellular structure within the finished article. Although blowing agents typically reduce the cost and weight of finished plastic articles, there are certain drawbacks to the use of blowing agents.

While it is often desirable to have a cellular structure within a plastic article, this cellular structure is typically undesirable on the outer shell of a finished plastic article. Bubbles forming near the outer shell of a curing plastic article often result in unaesthetic holes appearing in the surface of the article or compromise the integrity of the surface by creating sink holes as the article cures or weak points where the article is unable to sustain pressure.

It would be most desirable to mold a plastic part with a uniform cellular structure on the interior which allows the part to be molded lighter and with less material, while at the same time having a denser outer skin which would increase the aesthetic and structural aspects of the finished article. Heretofore, it has been impossible to injection mold plastic material with a blowing agent to produce a plastic article without surface defects.

Injection molding machines generally include a two-section mold unit wherein one of the mold sections is stationary and the other mold section generally is movable between an open position away from the stationary mold section and a closed position wherein the two mold sections are in sealed contact engagement to form a mold cavity. The stationary mold section generally includes an opening for the injection of a mold material into the cavity. While it has been possible in the past to mold the rare interior of a plastic article and then coat this material with a sealer or secondary layer of dense plastic material, such a secondary step is time consuming and costly. It has heretofore not been possible to mold a plastic article with a dense outer shell and a rare interior in a single step.

The difficulties encountered in the prior art discussed hereinabove are substantially eliminated by the present invention.

SUMMARY OF THE INVENTION

Accordingly, it is an object of the present invention to provide a method for molding a reduced density plastic article without voids on or near the surface of the article.

Another object of the present invention is to provide a repeatable method for producing a plastic article with a dense outer skin and a rare uniform interior.

Yet another object of the present invention is to provide an apparatus for reproducably molding a plastic article with a dense outer skin and a rare uniform interior.

These and other objects of the invention will become apparent upon reference to the following specification, drawings, and claims.

By the present invention, it is proposed to overcome the difficulties encountered heretofore. To this end, a method of molding a plastic article is provided whereby a first mold section and second mold section are clamped together to form a mold cavity of an initial volume. A blowing agent is mixed with a plastic injection material to form an injection mixture. The injection mixture is then injected into the mold cavity and allowed to cool against the interior sides of the mold cavity. The first mold section and second mold section are then moved together to reduce the volume of the mold cavity to a compression volume. The injection material is then allowed to cool and thereafter removed from the mold cavity. In the preferred embodiment, a density reduction stage is added after the injection mixture is injected into the mold cavity and allowed to cool against the interior sides of the mold cavity. This expansion of the mold cavity to an intermediate volume allows the injection mixture to expand and evenly distribute a cellular structure throughout the plastic article.

BRIEF DESCRIPTION OF THE DRAWINGS

In the drawings:

FIGS. 2a–b are a side elevational view and close-up of the mold apparatus showing the mold unit in the initial molding position as a plastic material is injected into the mold unit;

FIGS. 3a–b are a side elevational view and close-up of the mold apparatus showing the mold unit in the density reduction position.

FIGS. 4a–b are a side elevational view and close-up of the mold apparatus showing the mold unit in the recompression position;

DETAILED DESCRIPTION OF THE INVENTION

Figure 1:
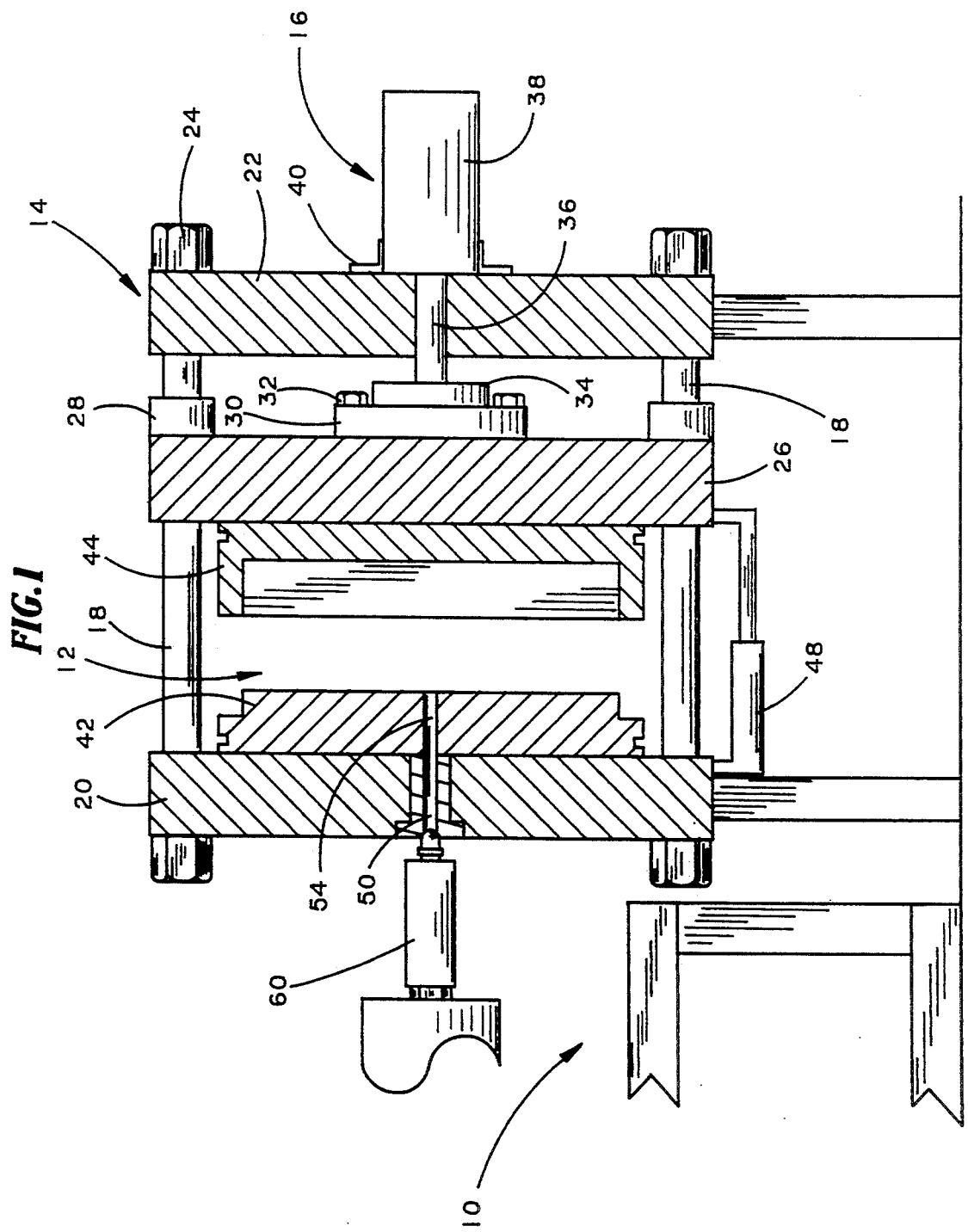
FIG. 1 is a side elevational view of the molding machine showing the mold unit in the open position.

In the figures, a mold apparatus 10 is shown including a mold unit 12, a mold frame 14, and a hydraulic piston 16 (FIG. 1). The mold frame 14 consists of four cylindrical support bars 18 which are secured to a first plate 20 and a second plate 22 by means of nuts 24. A slidable carriage 26 is slidably attached to the support bars 18 through bores which pass through the corners of the carriage. Support blocks 28 are provided with bores and mounted to the corners of the carriage 26 to add extra support to the carriage 26 as it slides along the support bars 18. A platen 30 is secured to the carriage 26 by means of bolts 32 to evenly disburse force over the carriage 26. Secured to the platen 30 is a ram footing 34 which, in turn, is secured to a piston ram 36. The ram piston 36 passes through a bore in the center of the second plate 22 and is connected to a hydraulic cylinder 38. The hydraulic cylinder 38 and ram piston 36 make up the hydraulic piston 16. The hydraulic cylinder 38 is secured to the second plate by means of a bracing assembly 40. A first mold section 42 is mounted to the first plate 20 in alignment with a second mold section 44 which is mounted to the mold carriage 26.

As the hydraulic piston 16 pushes the mold carriage 26 toward the first plate 20, the first mold section 42 fits into seated engagement with the second mold section 44 to form a mold cavity 46 therebetween. As shown in FIGS. 2a-b, 3a-b, and 4a-b, the volume of the mold cavity 46 may be increased or decreased by moving the second mold section 44 away from or toward the first mold section 42.

A small linear actuator 48 is mounted to both the first plate 20 and carriage 26 to monitor the distance between these two points to allow the calculation of the volume of the mold cavity 46 when the second mold section 44 is placed at various distances relative to the first mold section 42 (FIG. 1). A nozzle inlet 50 is located in the center of the first plate 20 to allow a plastic material 52 to pass into a mold inlet 54 located in the first mold section 42 and thereafter into the mold cavity 46.

To begin the molding process the hydraulic piston 16 is actuated to force the piston 36 toward the first plate 20 (FIG. 1). The platen 30 disburses the force of the piston 36 to the mold carriage 26 and the second mold section 44. The second mold section 44 is moved toward the first mold section 42 until a mold cavity 46 of an initial volume is formed (FIGS. 2a-b). In the preferred embodiment of the present invention, this initial volume of the mold cavity 46 is the volume formed when the second mold section 44 has been moved toward the first mold section 42 as far as possible. It should be noted, however, that an infinite number of initial volumes for the mold cavity 46 may be chosen depending on the size and density requirements of the finished article.

A reaction material 52 is prepared by adding a blowing agent to a plastic injection material. Although several blowing agents are known in the art, in the preferred embodiment the blowing agent is azodicarbonamide. Azodicarbonamide decomposes when heated to produce a gas consisting of mainly nitrogen and carbon monoxide. In the preferred embodiment of the present invention 30 percent by weight of azodicarbonamide is added to polyurethane to produce the reaction material 52. The reaction material 52 is heated, plasticized, and injected into the mold cavity 46.

After the second mold section 44 and first mold section 42 have been moved into sealed engagement, an injection nozzle 60 is moved into the nozzle inlet 50 and the reaction material 52 is injected through the mold inlet 54 into the mold cavity 46 (FIGS. 2a-b). The injection of material 52 into the mold cavity 46 continues until the mold cavity 46 is completely filled. In the preferred embodiment of the present invention, the first mold section 42 and second mold section 44 are constructed of steel. The high heat capacity of the steel acts as a heat sink to draw heat out of the reaction material 52.

The portion of the material 52 contiguous with the interior walls of the mold cavity 46 cools faster than the portion of the material 52 in the center of the mold cavity 46 because the steel in the first mold section 42 and second mold section 44 draw heat out of the portion of the reaction material 52 contiguous with the interior walls of the mold cavity 46 faster than heat can be removed from the interior portion of the plastic article 56. As the exterior of the plastic article 56 cures, a skin 58 is formed everywhere that the reaction material 52 contacts the interior wall of the mold cavity 46. The plastic article 56 is thereby surrounded with a dense outer skin 58.

The mold cavity 46 is completely filled with reaction material 52 and the skin 58 forms very quickly so that the blowing agent mixed in to the plastic material 52 does not have a chance to produce a large number of gas bubbles to reduce the density of the plastic article 56.

The interior walls of the mold cavity 46 are cooler than the reaction material 52 and cool the material 52 from the outside to the inside. The temperature of the material 52 drops below the temperature at which the blowing agent becomes active and a high-density shell of material 52 which will not expand forms around the perimeter of the material 52 (FIGS. 2a-b). After an adequate thickness of high-density skin 58 is allowed to form on the plastic article 56, the hydraulic piston 16 is engaged to move the second mold section 44 away from the first mold section 42 to increase the volume of the mold cavity 46. In the preferred embodiment of the present invention the second mold section 44 is moved away from the first mold section 42 a distance sufficient to increase the volume of the mold cavity 46 to three hundred percent of the initial volume (FIGS. 3a-b). The distance between the first mold section 42 and the second mold section 44 in the mold cavity 46 is initially two centimeters and the second mold section 44 is moved away from the first mold section 42 so that the distance between the first mold section 42 and second mold section 44 in the mold cavity 46 changes from two to six centimeters thereby tripling the volume of the mold cavity 46. During this intermediate stage of the molding process, the axodicarbonamide, which remains at a sufficiently high temperature, degradizes to produce additional gas bubbles which push the plastic material 52 toward the walls of the mold cavity 46.

As the gas bubbles 62 force the plastic material 52 toward the outer walls of the mold cavity 46, the density of the plastic article 56 is reduced. A compression stage is thereafter begun whereby the hydraulic piston 16 moves the first mold section 42 toward the second mold section 44 thereby reducing the volume of the mold cavity 46 (FIGS. 4a-b). The width of the mold cavity is reduced to a point where the distance between the first mold section 42 and the second mold section 44 in the mold cavity 46 is four centimeters, thereby reducing the volume of the mold cavity 46 by one-third. Depending on the density required for the final part, the mold sections 42 and 44 may be pressed closer or further apart from one another. During the compression stage a plastic article 56 is produced having a dense outer skin 58 and a rare interior 64.

During the compression stage, gas bubbles 62 are produced and moved toward portions of the plastic article 56 which have few gas bubbles 62. The gas bubbles, therefore, are evenly distributed throughout the plastic article 56 during the compression stage to form a highly reproducable plastic article 56 with a uniform cellular interior 64.

Because the skin 58 of the plastic article 56 is allowed to cool against the interior walls of the mold cavity 46 before the blowing agent can become active, no holes or voids are produced by the blowing agent near the surface of the plastic article 56. Surface aberrations and voids are thereby substantially eliminated while the benefits of a density reduced article, including a material savings and a lighter weight structure, are retained.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated to be within the scope of the invention to eliminate the density reduction phase and to merely compress the reaction material 60 after a sufficient number of gas bubbles 62 have been formed to provide the desired density of the plastic article 56.

I claim:

1. A method of plastic injection molding a plastic article comprising:
   (a) providing a first mold section;
   (b) providing a second mold section which, when moved into sealed engagement with said first mold section, forms a mold cavity for molding a plastic article;
   (c) mixing a blowing agent with a plastic injection material to form an injection mixture;
   (d) clamping said first mold section and said second mold section together to form said mold cavity of an initial volume;
   (e) maintaining said mold cavity at said initial volume as said injection mixture is injected into said mold cavity until said initial volume of said mold cavity is substantially filled with said injection mixture;
   (f) allowing said injection mixture to cool and form a skin against interior sides of said mold cavity;
   (g) moving said first mold section and said second mold section apart whereby said initial volume of said mold cavities increased to an intermediate volume;
   (h) allowing said injection mixture to expand;
   (i) moving said first mold section and said second mold section together whereby said intermediate volume of said mold cavity is decreased to a compression volume;
   (j) allowing said injection material to cool; and
   (k) removing the finished plastic article from said mold cavity.

2. The method, according to claim 1, wherein said compression volume is 30–70% of said intermediate volume.

3. The method, according to claim 1, wherein said compression volume is greater than said initial volume.

4. The method, according to claim 1, wherein said injection mixture is allowed to expand to said intermediate volume before moving said first mold second section together to decrease said intermediate volume to said compression volume.

5. The method, according to claim 1, wherein said interior sides of said mold cavity are kept at a temperature below that at which said blowing agent is active.

6. The method, according to claim 1, wherein said first mold section and said second mold section are moved in relationship to one another by hydraulic pistons.

7. The method, according to claim 1, wherein said compression volume is 150–250% of said initial volume.

8. The method, according to claim 1, wherein said intermediate volume is 200–400% of said initial volume.